United States Patent
Le Corre et al.

(10) Patent No.: US 11,433,807 B2
(45) Date of Patent: Sep. 6, 2022

(54) OPTICAL SYSTEM FOR INTERIOR LIGHTING OF A VEHICLE

(71) Applicant: VALEO VISION, Bobigny (FR)

(72) Inventors: Jérome Le Corre, Bobigny (FR); Patrice Collot, Bobigny (FR); Julia Petit, Bobigny (FR)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 17/276,249

(22) PCT Filed: Sep. 23, 2019

(86) PCT No.: PCT/EP2019/075457
§ 371 (c)(1),
(2) Date: Mar. 15, 2021

(87) PCT Pub. No.: WO2020/064590
PCT Pub. Date: Apr. 2, 2020

(65) Prior Publication Data
US 2022/0032841 A1 Feb. 3, 2022

(30) Foreign Application Priority Data
Sep. 27, 2018 (FR) ...................................... 1858875

(51) Int. Cl.
*B60Q 3/60* (2017.01)
*B60Q 3/14* (2017.01)
(Continued)

(52) U.S. Cl.
CPC ................ *B60Q 3/60* (2017.02); *B60Q 3/14* (2017.02); *B60Q 3/217* (2017.02); *B60Q 3/78* (2017.02);
(Continued)

(58) Field of Classification Search
CPC ... B60Q 3/60; B60Q 3/62; B60Q 3/64; B60Q 3/66; B60Q 3/78; F21Y 2107/70; F21V 7/06; F21V 7/08; F21V 7/09
See application file for complete search history.

(56) References Cited

U.S. PATENT DOCUMENTS 5,803,579 A * 9/1998 Turnbull ................. F21S 41/28
362/516
8,162,519 B2 4/2012 Salter et al.
(Continued)

FOREIGN PATENT DOCUMENTS

CN 105308419 A * 2/2016 ............... B60Q 3/76
DE 19702957 A1 * 8/1998 ............... B60Q 3/14
(Continued)

OTHER PUBLICATIONS

European Patent Office, International Search Report and Written Opinion for International Application No. PCT/EP2019/075457, dated Jan. 20, 2020.

*Primary Examiner* — Colin J Cattanach
(74) *Attorney, Agent, or Firm* — Valeo Vision (57) ABSTRACT

The invention concerns a motor vehicle's optical system for interior lighting where the optical system includes a screen and multiple light sources disposed in series where the light sources are configured to project a screen light beam and the optical system includes a light box between the light sources and the screen and where the light box includes multiple cavities where each light source is associated with a light box cavity and where each light source is activated independently. The invention also concerns a motor vehicle's interior lighting device that includes this kind of optical system.

12 Claims, 7 Drawing Sheets

(51) Int. Cl.
  *B60Q 3/78* (2017.01)
  *B60Q 3/217* (2017.01)
  *B60Q 3/64* (2017.01)
  *B60Q 3/62* (2017.01)
  *B60Q 3/66* (2017.01)
  *F21V 7/09* (2006.01)
  *F21V 7/08* (2006.01)
  *F21Y 107/70* (2016.01)
  *F21V 7/06* (2006.01)

(52) U.S. Cl.
  CPC ............... *B60Q 3/62* (2017.02); *B60Q 3/64* (2017.02); *B60Q 3/66* (2017.02); *F21V 7/06* (2013.01); *F21V 7/08* (2013.01); *F21V 7/09* (2013.01); *F21Y 2107/70* (2016.08)

(56) References Cited

U.S. PATENT DOCUMENTS

| | | | | |
|---|---|---|---|---|
| 9,896,023 B1 * | 2/2018 | Salter | .................... | F21S 43/255 |
| 2002/0041498 A1 | 4/2002 | Furst et al. | | |
| 2006/0187077 A1 * | 8/2006 | Wu | .................... | B60Q 3/16 |
| | | | | 340/815.4 |
| 2008/0043466 A1 * | 2/2008 | Chakmakjian | ........ | F21V 17/002 |
| | | | | 362/237 |
| 2013/0027976 A1 * | 1/2013 | Robbins | .................. | B60Q 1/302 |
| | | | | 362/612 |
| 2015/0266419 A1 * | 9/2015 | Pasotti | ...................... | B60Q 3/14 |
| | | | | 362/23.11 |
| 2016/0031369 A1 * | 2/2016 | Zietz | ....................... | G01D 11/28 |
| | | | | 362/23.08 |
| 2017/0327031 A1 | 11/2017 | Bauerle | | |

FOREIGN PATENT DOCUMENTS

| | | | | |
|---|---|---|---|---|
| DE | 102016200579 A1 | 7/2017 | | |
| EP | 2924486 A1 | 9/2015 | | |
| FR | 3005717 A1 | 11/2014 | | |
| GB | 2536712 A * | 9/2016 | ............... | B60Q 3/80 |
| JP | H10142010 A | 5/1998 | | |
| JP | 2007131126 A | 5/2007 | | |
| WO | WO-0183255 A1 * | 11/2001 | ............ | B60K 37/02 |
| WO | WO-2014078170 A1 * | 5/2014 | ............ | B60Q 3/16 |
| WO | 2016079459 A1 | 5/2016 | | |

* cited by examiner

OPTICAL SYSTEM FOR INTERIOR LIGHTING OF A VEHICLE

CROSS-REFERENCE TO RELATED APPLICATIONS

This is a 371 application (submitted under 35 U.S.C. § 371) of International Application No. PCT/EP2019/075457 (WO2020064590) filed on Sep. 23, 2019, which claims the priority date benefit of French Application No. FR1858875 filed on Sep. 27, 2018, the disclosures of which are hereby incorporated by reference in their entirety.

TECHNICAL FIELD

The field of the present invention is that of optical systems, intended in particular to light the interior of a passenger compartment of a vehicle, in particular a motor vehicle.

Known in the prior art are optical systems of this kind comprising a light source, a screen and a light guide situated between the screen and the light source. The light source enables the emission of a light beam, the light guide enabling homogenization of the light beam whilst enabling routing the light beam to the screen, the latter finally enabling diffusion of the light beam.

These known optical systems are not entirely satisfactory and have drawbacks. In fact, the use of a known light guide necessitates a minimum overall size in order to enable good homogenization of the light beam before it is transmitted to the screen, this overall size not always being compatible with constraints linked to the available space or to a geometrical shape at the location where the optical system has to be installed in the passenger compartment of the motor vehicle. Also, the internal volume of the light guide in which the light beam emitted by the light source moves is filled by the material constituting the light guide, conventionally polymethylmethacrylate (PMMA), and this imposes refraction of the light beam inside the light guide, said refraction possibly interfering with the homogenization of the light beam in the light guide.

BACKGROUND

An object of the present invention is to propose an optical system enabling the aforementioned drawbacks to be addressed at least in part and also having other advantages. Thus an object of the present invention is to enable the use of an optical system in a narrow space that does not allow the use of a known light guide and in particular the use of an optical system in the form of a strip, thus having a primary dimension on a longitudinal axis of the optical system and a secondary dimension on an axis perpendicular to the longitudinal axis, the primary dimension being significantly greater than the secondary dimension, whilst ensuring satisfactory homogenization of the light beam by the optical system. Also, an object of the invention is to enable dynamic lighting to be obtained in which a plurality of light sources of the optical system are able to be turned on and/or turned off successively in order to display information and/or to create an ambient lighting effect inside the passenger compartment of the motor vehicle.

SUMMARY

In a first aspect the invention achieves this through an optical system for interior lighting of a motor vehicle, the optical system comprising a screen and a plurality of light sources disposed in series, the plurality of light sources being configured to project a light beam onto the screen, characterized in that the optical system comprises a light box between the plurality of light sources and the screen, the light box comprising a plurality of cavities, each light source being associated with a cavity of the light box, each light source being activatable independently.

The interior lighting of the motor vehicle is intended to light the interior of a passenger compartment of the motor vehicle.

The series arrangement of the plurality of light sources forms a longitudinal axis of the optical system. It is to be understood that the series arrangement of the light sources refers to the positioning of the light sources of the plurality of light sources one after the other, forming a curve or a straight line, and not to the type of electrical circuit supplying electrical power to the light sources.

The plurality of light sources, the light box and the screen are stacked in series one after the other along a stacking axis perpendicular to the longitudinal axis.

The optical system forms a lighting strip. In fact, the optical system extends along a vertical axis perpendicular to a plane formed by the longitudinal axis and the stacking axis over a distance preferably between 6 millimetres and 25 millimetres inclusive while it extends along the longitudinal axis over a distance preferably greater than 20 centimetres. The optical system preferably extends on the stacking axis over a distance between 5 and 40 millimetres inclusive. The light box defines an internal volume filled with air delimited by walls having reflective properties. The light beam is therefore emitted from the light source before being projected onto the screen, being deviated only by one or more reflections from the walls of the light box before being projected onto the screen.

1. The light box according to the invention therefore differs from a light guide also defining an internal volume delimited by walls but filled with the material constituting the walls of the light guide, the material constituting the light guide being for example polymethylmethacrylate (PMMA). According to the invention, the light beam is not refracted in the light box, the latter being filled with air, in contrast to a light beam moving in a known light guide.

2. The light box comprises a plurality of cavities disposed in series one after the other along the longitudinal axis, each cavity being delimited by a reflective wall formed by the material constituting the light box. The reflective wall delimiting each of the cavities therefore enables guiding of the light beam emitted by the light source, in particular toward a zone of the screen situated facing said cavity, the light source being situated inside the cavity or at the edge of the latter so as to emit a beam into the cavity. The wall of a first cavity is therefore configured so that the light beam emitted by a first light source present in said first cavity is projected at the level of a screen zone situated facing the first cavity. The wall of the first cavity therefore prevents the light beam emitted by the first light source from being projected at the level of a screen zone facing a second cavity, said second cavity being in particular adjacent to the first cavity. The wall of the cavity therefore makes it possible to prevent the light beam emitted by the light source situated in said cavity from being at least partly projected into another cavity.

3. Each light source may be activated and/or deactivated independently of the other light sources, thus forming a selectively activatable matrix beam. For example, a first light source may be activated, then emitting a light beam, while an adjacent light source is deactivated, not emitting a light beam. This therefore enables lighting or extinguishing different zones of the screen and production of a light matrix the shape of which can be modified at will.

4. Finally, in this configuration according to the invention, the optical system includes no supplementary optical component between the light source and the screen for homogenizing the light beam.

The optical system according to the first aspect of the invention advantageously comprises at least one of the following improvements, the technical features forming those improvements being adopted separately or in combination:

The cavity comprises an elliptical profile in a first plane perpendicular to the screen and passing through the light source associated with said cavity. The screen zone associated with a cavity is defined as a zone that extends along a first axis and a second axis that are mutually perpendicular, the screen zone comprising a shorter side on the first axis and a longer side on the second axis, the shorter side being defined by a smaller dimension than the longer side. In particular, the first axis is the vertical axis, the second axis for its part being the longitudinal axis. The cavity has an elliptical profile in a first plane perpendicular to the screen and passing through the light source associated with said cavity and comprising the first axis. The elliptical profile of the cavity therefore makes it possible to favour the reflection of the light rays of the light beam so that the light rays are concentrated at the level of the screen, the concentration of the light rays being in accordance with a vertical configuration, that is to say along the first axis. According to this configuration, the elliptical profile of the cavity therefore enables concentration of the reflected rays at the centre of the screen in the vertical direction, that is to say the direction perpendicular to the stacking axis and the longitudinal axis.

The cavity comprises a parabolic profile in a second plane perpendicular to the screen that passes through the light source associated with said cavity. In accordance with the above description, the screen zone associated with a cavity is defined as a zone that extends along a first axis and a second axis that are mutually perpendicular, the screen zone comprising a shorter side on the first axis and a longer side on the second axis, the shorter side being defined by a smaller dimension than the longer side. In particular, the first axis is the vertical axis, the second axis for its part being the longitudinal axis. The cavity has a parabolic profile in a second plane perpendicular to the screen and passing through the light source associated with said cavity and comprising the second longitudinal axis. The parabolic profile of the cavity enables collimation of the light rays of the light beam and disposition thereof in a plane comprising the second longitudinal axis enables homogeneous distribution along the longitudinal axis of the light beam at the level of the screen zone facing the light source generating said light beam in the cavity. With each of the cavities having a parabolic profile of this kind, a homogeneous distribution of the beam is progressively obtained over all of the length of the strip forming the screen surface.

The optical system advantageously comprises both an elliptical profile in the first plane and a parabolic profile in the second plane. This configuration therefore enables both concentration of the light rays at the level of the screen because of the elliptical profile and collimation of the light beam emitted by the light source because of the parabolic profile.

The first plane and the second plane are mutually perpendicular. The first plane advantageously extends along the stacking axis and the vertical axis, the second plane advantageously extending along the stacking axis and the longitudinal axis, the vertical axis being parallel to the shorter side of the screen zone, the longitudinal axis being parallel to the longer side of the screen zone.

The light source is an RGB light source and/or an RGBW light source. Each RGB light source may emit a red, green or blue beam, or a combination of red, green and/or blue beams. An RGBW light source may further emit alternatively or cumulatively a white beam produced by appropriate wavelength conversion means. According to this configuration, the plurality of light sources may comprise only RGB light sources or only RGBW light sources or a combination of RGB light sources and RGBW light sources. Each light source may in particular be a light-emitting diode (LED).

The light box comprises a dimension along a stacking axis that is variable between a first longitudinal end and a second longitudinal end. This configuration enables the method of manufacturing the optical system to be facilitated. In fact, the light sources are mounted on a printed circuit. The use of a printed circuit situated in a single plane enables the method of manufacturing the optical system to be facilitated and thus its manufacturing cost to be reduced. According to this configuration, the light box enables compensation of the plane difference between a first zone of the screen and a second zone of the screen, for example when the screen has a curvature along the longitudinal axis, while the printed circuit on which the light sources are mounted extends parallel to the longitudinal axis. The compensation of the plane difference is more particularly obtained by the modification of a profile of a cavity, in particular the elliptical profile and/or the parabolic profile of the cavity, or again by modifying the dimension of the light box along the stacking axis.

A ratio between a first dimension specific to a wall of a cavity and a second dimension specific to the light box, the first dimension and the second dimension being measured parallel to the stacking axis, is between 40% and 85% inclusive. The first dimension is more particularly measured between a bottom of the cavity, that is to say in the vicinity of the light source, and a free end of the wall situated opposite the cavity relative to the bottom. The second dimension is for its part measured between the bottom of the cavity and the part of the light box that receives the screen.

An internal face of the wall is covered with a material simultaneously enabling specular reflection and diffuse reflection of the light beam. The internal face of the wall is the face of the wall that is situated toward the interior of the cavity. In other words, the internal face of the wall is exposed to the light rays of the light beam emitted by the light source present in said cavity. The material is advantageously white in colour, thus enabling reflection of all of the wavelengths of the light beam. For example, said material may be the following material: ALBIS ALCOM PWL 10/1.1 WT1302-05LB. This material is advantageous as it offers a good compromise between specular and diffuse reflection. The ratio between the specular reflection and the diffuse reflection induced on projection of a light beam onto this material is therefore between 5% specular reflection for 95% diffuse reflection and 40% specular reflection for 60% diffuse reflection inclusive. A material having similar or near characteristics therefore enables improved homogenization of the light rays of the light beam. Also, it is noteworthy that, according to the invention in a configuration comprising an elliptical and/or parabolic profile, the light source has theoretically to be positioned at the level of an object focus of the profile. However, the use of a light box in which the internal face of the wall is covered by a material of this kind enables flexibility in the theoretical disposition of the light source at the level of the object focus.

The internal face of the wall comprises a plurality of diffusing microstructures. The diffusing microstructures make it possible to favour diffuse reflection, in particular compared to a configuration in which the internal face of the wall has no diffusing microstructures, such diffusing microstructures being able to as much as double the diffuse reflection. The diffusing microstructures therefore enable improved homogenization of the light rays of the light beams at the level of the light box. For example, the diffusing microstructures may take the form of pads extending from the internal face of the wall toward the interior of the cavity.

The diffusing microstructures may be situated on the elliptical profile and/or on the parabolic profile of the internal face of the wall.

The diffusing microstructures are preferably situated in a proximal part of the cavity, that is to say in the vicinity of the light source along the stacking axis.

The screen is a diffusing screen. This configuration enables homogenization of the colorimetry and/or the luminance of the light beam at the level of each zone of the screen.

The optical system includes a control module configured to give instructions for selective activation of the light sources to enable the display of a dynamic and/or multicolor light signal. The light signal corresponds to the projection onto the screen of a global light beam formed by all the individual light beams emitted by each light source. The light signal is therefore dynamic if the global light beam is modified in time by lighting and extinguishing different screen zones. The strip formed by the optical system preferably extends on the longitudinal axis over a distance preferably greater than 20 centimetres, thus enabling a dynamic effect to be imparted to the light signal perceptible by an occupant in the motor vehicle. The light signal is multi-color if it features two different colours at the level of two different screen zones. The optical system can therefore be used, for example, as a turn indicator repeater or as an indicator of something present in a blind spot of the vehicle. In this latter example the object, such as another motor vehicle, present in the blind spot can therefore be symbolized by a light signal moving on the screen.

In accordance with a second aspect, the invention also consists in a motor vehicle comprising an interior lighting device, the interior lighting device comprising an optical system conforming to the first aspect of the invention.

This configuration in accordance with the second aspect therefore enables a motor vehicle to include an optical system conforming to the first aspect, thus enabling the installation of an optical system according to the invention at a location in the passenger compartment in which the installation of a known optical system is impossible, in particular because of spatial overall size constraints of the known optical system.

In a motor vehicle conforming to the second aspect of the invention, the optical system is advantageously a strip on a door and/or a dashboard of the motor vehicle. This configuration enables the optical system to be visible to the driver and/or a passenger of the motor vehicle. The driver and/or the passenger can therefore receive information via the light signal, the information concerning for example a situation of the road scene. Alternatively or cumulatively, the optical system may be situated at any other location in a passenger compartment of the motor vehicle.

BRIEF DESCRIPTION OF THE DRAWINGS

These Other features, details and advantages of the invention will become more clearly apparent on reading the following description of embodiments given by way of nonlimiting illustration with reference to the appended diagrammatic drawings, in which.

DETAILED DESCRIPTION

The features, the variants and the various embodiments of the invention may be associated with one another in accordance with diverse combinations provided that they are not incompatible or mutually exclusive. There may in particular be imagined variants of the invention comprising only a selection of the features described hereinafter separately from the other features described if that selection of features is sufficient to confer a technical advantage or to distinguish the invention from the prior art.

In particular all the variants and all the embodiments described are combinable with one another if there is nothing to oppose that combination from the technical point of view.

Figure 1:
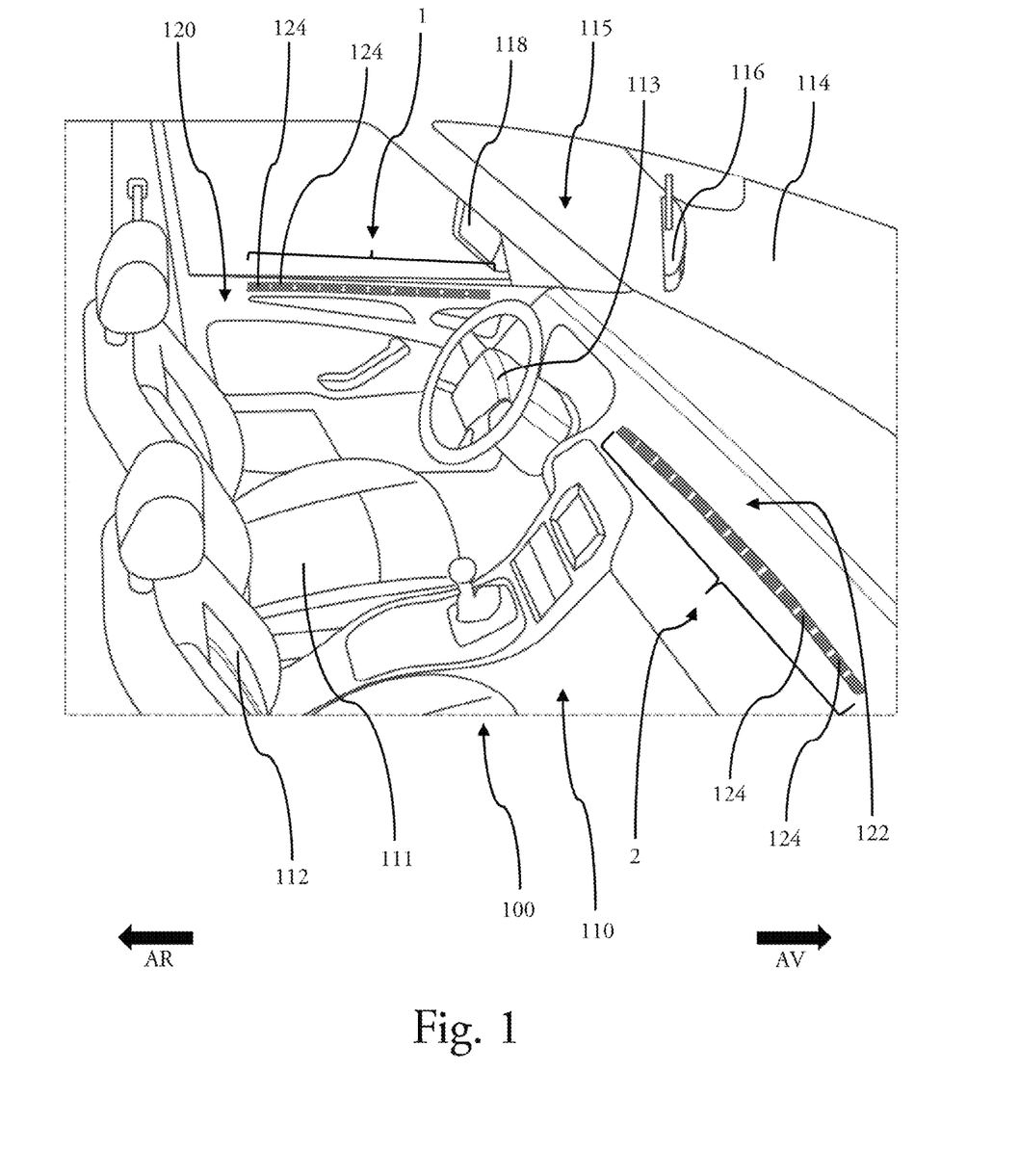
FIGS. 1 and 2 show a perspective view of a passenger compartment of a motor vehicle conforming to the second aspect of the invention, FIGS. 1 and 2 showing two embodiments of an optical system of the motor vehicle.
Figure 2:
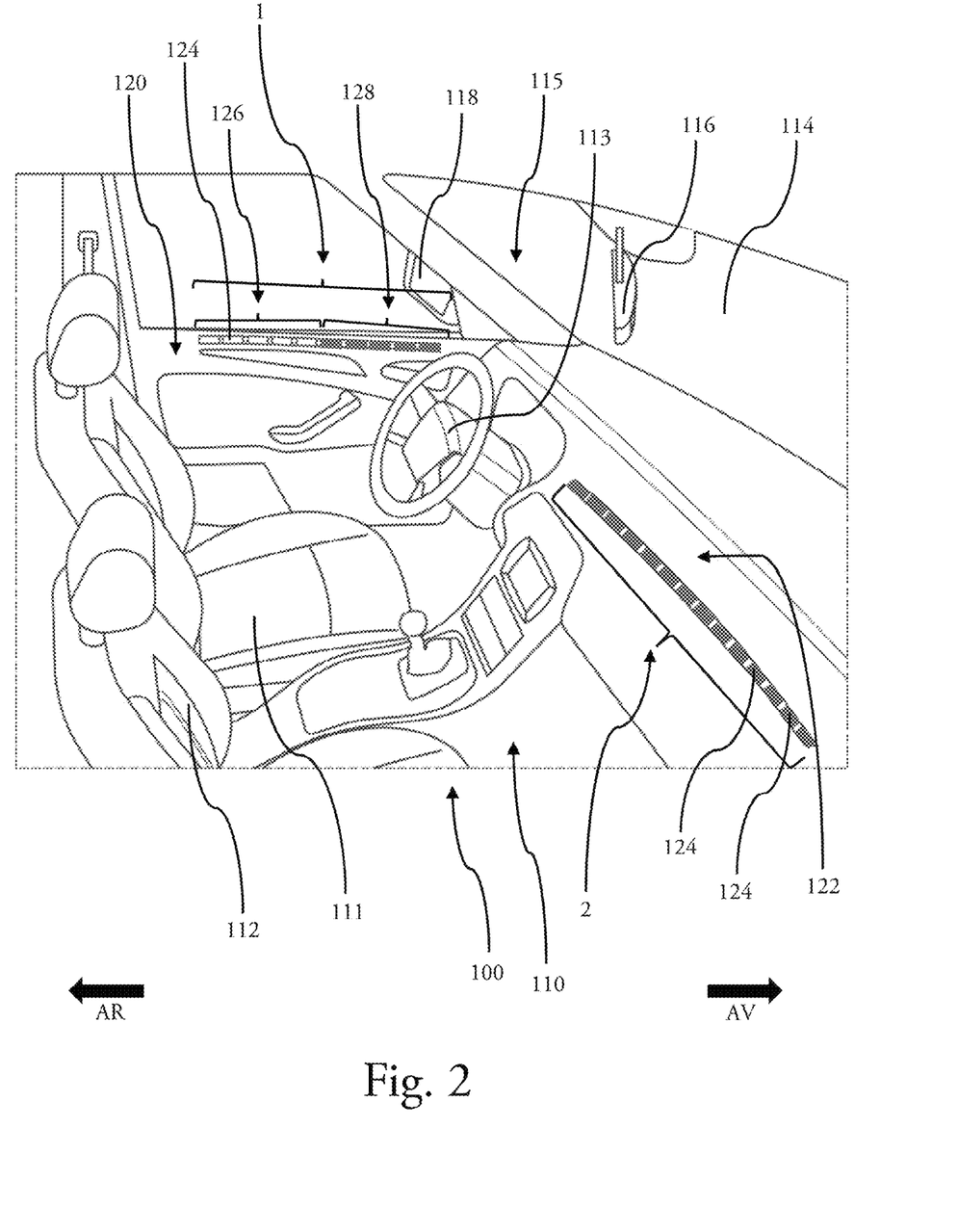

FIGS. 1 and 2 show a perspective view of a passenger compartment 110 of a motor vehicle 100 conforming to the second aspect of the invention, FIGS. 1 and 2 showing two operating modes of an optical system of the motor vehicle 100.

The passenger compartment 110 of the motor vehicle 100 contains a first seat 111 and a second seat 112, the first seat, situated facing a steering wheel 113, being intended to receive a driver of the motor vehicle, the second seat being intended to receive a passenger. The passenger compartment further includes a windscreen 114 enabling the occupants of the motor vehicle to perceive the road scene in front of the vehicle (AV). The motor vehicle also includes an internal rear view mirror 116 situated inside the passenger compartment and an exterior rear view mirror 118 situated outside the passenger compartment, the interior rear view mirror 116 and the exterior rear view mirror 118 enabling the conductor to perceive the road scene behind the motor vehicle (AR), the front AV and the rear AR being defined relative to the primary direction of movement of the motor vehicle 100.

The passenger compartment includes a first optical system 1 and a second optical system 2 respectively in the form of a strip on a door 120 and a dashboard 122 of the motor vehicle, the dashboard denoting the part of the passenger compartment situated in front of the first seat and the second seat and extending between a right-hand side and a left-hand side of the passenger compartment. For example, the dashboard includes an instrument panel facing the driver and comprising a plurality of indicators, such as a speed or engine speed indicator, the dashboard possibly also including one or more ventilation outlets facing the driver and/or the passenger. The first optical system 1 and the second optical system 2 are part of an interior lighting device 115 of the vehicle, the interior lighting device 115 possibly also including, for example, a light on a ceiling of the passenger compartment or a light in a glovebox.

Each optical system 1, 2 comprises a plurality of distinct display surfaces or screen zones 124, each screen zone being associated with a light source of the optical system 1, 2. Each optical system therefore forms a strip having a primary dimension on a longitudinal axis of the optical system and a smaller secondary dimension on an axis perpendicular to the longitudinal axis of the optical system. The optical system includes a control module not shown in FIGS. 1 and 2 configured to issue instructions for selective activation of the light sources of the optical system, thus enabling generation of a dynamic and/or multi-color light signal at the level of the optical system 1, 2, the light signal corresponding to all of the light beams generated by the light sources of the optical system.

FIG. 1 shows a standby mode of operation in which no particular driving situation has been detected. In this kind of situation the first optical system 1 and the second optical system 2 are inactive, here with the light sources of the first optical system and the second optical system extinguished and therefore not emitting any light beam. As a result, the first optical system 1 and the second optical system 2 do not generate any light signal. It is clear that as an alternative the first optical system 1 and/or the second optical system 2 may equally be configured so as to generate a standby light signal not indicating any particular driving situation, the light signal then possibly being static and/or monochrome.

FIG. 2 shows an active mode of operation in which a particular driving situation has been detected. More particularly, in the example shown, the first optical system 1 is rendered active and the second optical system 2 is inactive or in its previous state in the standby operating mode. In fact, a first portion 126 of the light sources of the first optical system is lit, each light source of the first portion emitting a light beam passing through the display surface or the corresponding screen zone. A contrario, a second portion 128 of the light sources of the first optical system 1 is extinguished, not emitting any light beam. Accordingly, in this active operating mode it is clear that the lighting of one or more light sources of one and/or the other of the optical systems is controlled so as to enable the display of a light signal at the level of a larger or smaller portion of each optical system. By lighting and then extinguishing light sources arranged in longitudinal series one after the other, as described in more detail hereinafter, it is then possible to create a dynamic signal, that is to say a signal the configuration of which evolves over time as a function of the display surfaces or screen zones that are lit or extinguished.

In the driving situation shown in FIG. 2 the light signal displayed by the first optical system 1 can, for example, enable signalling of the presence of an element, notably another vehicle, situated on a left-hand side of the motor vehicle 100 relative to its direction of forward movement AV. The sequential lighting of the various light sources of the first optical system therefore enables diagrammatic representation of the position of the element relative to the motor vehicle 100 along an axis extending between the front AV and the rear AR of the motor vehicle 100. The first optical system for example enables the driver of the motor vehicle 100 to tell that they may effect a manoeuvre, in particular in order to change lane, securely and safely, by giving the driver visual information complementing the visual information provided by the interior rear view mirror and the exterior rear view mirror. In fact, this configuration enables the diver to avoid taking their gaze off the road scene situated in front of the vehicle (AV) in order in particular to look in a blind spot situated to the left of the driver, the blind spot corresponding to a zone of the visual field of the driver that is not covered either by their direct field of view or by that furnished by the interior rear view mirror 116 or the exterior rear view mirror 118. In this example the second optical system 2 is inactive, in particular because no element is detected on a right-hand side of the motor vehicle 100.

The first optical system 1 can therefore enable the driver of the motor vehicle to be informed that they can safely execute a change of lane manoeuvre toward the left in the driving situation shown in FIG. 1 whereas this kind of manoeuvre represents a hazard, in particular a potential collision, in the driving situation shown in FIG. 2.

Figure 3:
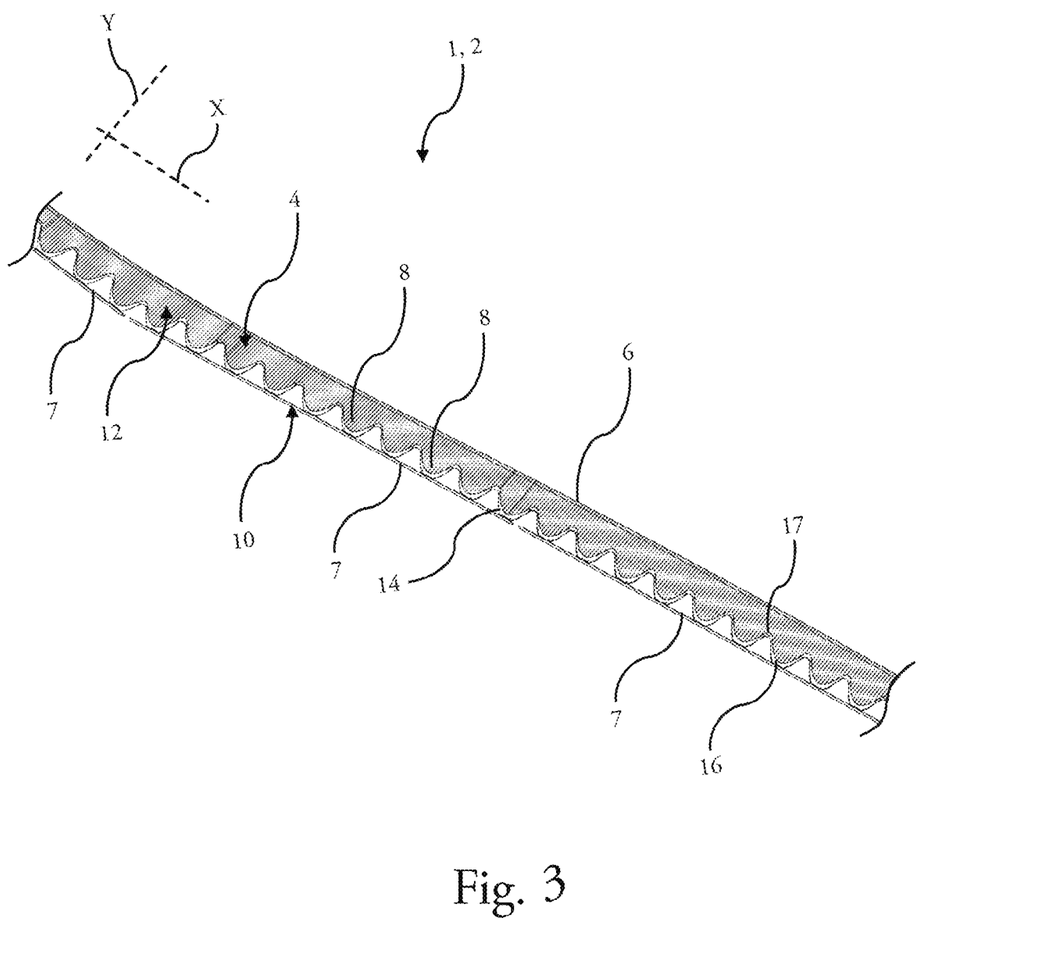
FIG. 3 is a partial perspective view of one embodiment of an optical system conforming to the first aspect of the invention.

FIG. 3 is a partial perspective view of one embodiment of an optical system 1, 2 conforming to the first aspect of the invention.

The optical system 1, 2 extends along a primary longitudinal axis X. The optical system 1, 2 includes a light box 4, a plurality of light sources and a screen 6 stacked in a stacking direction Y perpendicular to the longitudinal axis X. The screen 6 is intended to be oriented toward the interior of the passenger compartment of the motor vehicle, that is to say to be disposed between the passenger compartment and the light box 4, in order to enable the diffusion of the light signal intended for the occupants of the motor vehicle. The optical system extends on the longitudinal axis X preferably over at least 20 centimetres while it extends on a vertical axis perpendicular to a plane formed by the longitudinal axis X and the stacking axis Y preferably over a distance between 6 and 25 millimetres inclusive, the optical system 1, 2 thus forming a lighting strip.

The light box defines an internal volume 12 filled with air and delimited by a wall 14. The light box 4 comprises a plurality of cavities 8 arranged in series along the longitudinal axis and delimited from one another by the wall 14. The wall more particularly comprises a plurality of undulations defining a proximal end 16 and a distal end 17 of cavities on the stacking axis Y, the proximal end forming a bottom of the cavity, the distal end forming the end of the demarcation between two adjacent cavities. The optical system 1 comprises a plurality of light sources not visible in FIG. 3, each light source enabling the emission of a light beam inside a cavity 8. The internal volume 12 being filled with air, the light beam emitted by the light source is not refracted in the light box 4 on its path from the light source to the screen.

In the embodiment shown the optical system 1, 2 includes a printed circuit 10 situated opposite the optical system relative to the screen 6 on the stacking axis Y. The proximal end 16 is therefore situated near the printed circuit 10. The printed circuit 10 enables electrical connection of each light source of the optical module to a control module not shown here controlling the supply of electrical power to each of the light sources, thus enabling independent lighting and extinction of each light source of the optical system. The printed circuit 10 is made up of a plurality of segments 7, three segments 7 being visible in FIG. 3. The use of a printed circuit 10 formed in this way of a plurality of segments 7 enables some flexibility to be imparted to the printed circuit 10 and installation of the printed circuit to be allowed in a curved zone of the vehicle.

Figure 4:
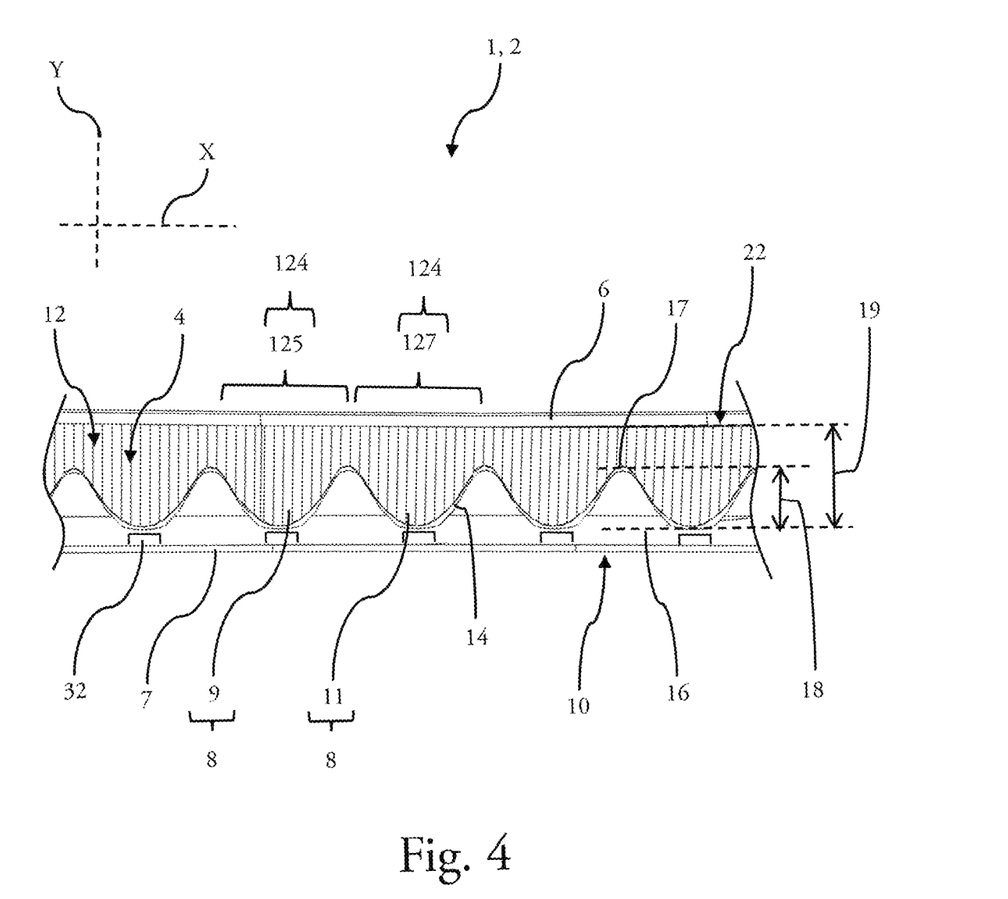
FIG. 4 shows a detail of the optical system shown in FIG. 3.

FIG. 4 is a partial perspective detail view of the optical system shown in FIG. 3.

Each light source 32 of the optical system 1, 2 is associated with a cavity 8 of the light box 4. Each light source more particularly projects from the printed circuit 10 and the wall 14 is configured with an orifice at the level of the proximal end 16 of each cavity so as to come to surround the corresponding light source, the proximal end 16 of the cavity being the part of the cavity at the greatest distance from the screen 6 along the stacking axis Y. The light source may be situated inside or at the edge of the cavity 8 provided that it enables the emission of a light beam inside said cavity. Each light source 32 is for example an RGB light source therefore enabling the emission of a red, green, blue light beam or a combination of red, green and blue light beams inside the cavity, thus enabling the formation of a multi-color light beam.

In the embodiment shown in FIGS. 3 and 4, the bottom of a cavity 8 is situated near the printed circuit 10. The proximal end 16 of the cavity therefore forms a first termination of the light box 4, a second termination 22 of the light box 4 being situated on the side of the light box opposite the first termination along the stacking axis Y, the second termination 22 therefore receiving the screen 6.

The wall 14 of the light box enables reflection of the light beam emitted by each light source. The wall delimiting each cavity 8 more particularly enables reflection of the light beam emitted by the light source associated with said cavity so that the light beam is projected at the level of a display surface or screen zone situated facing said cavity along the longitudinal axis X. The wall of a first cavity 9 therefore enables the light beam emitted by the light source situated at the level of said first cavity 9 to be projected at the level of a first screen zone 125 situated facing said first cavity 9 along the longitudinal axis X. In a similar manner the wall of a second cavity 11 adjacent to the first cavity 9 enables the light beam emitted by the light source situated at the level of said second cavity 11 to be projected at the level of a second screen zone 127 situated facing the second cavity 11 along the longitudinal axis X. It is clear that as a result the part of the wall 14 enabling delimitation of each cavity 8 enables the light beam emitted by the light source associated with said cavity 8 to be prevented from being projected at the level of a screen zone that is offset along the longitudinal axis relative to said cavity.

In order to favour this feature and to ensure that the part of the wall disposed between two cavities blocks sufficiently the rays liable to pass from one cavity to the other, the optical system is configured so that a ratio between a first dimension 18 specific to the wall of a cavity and a second dimension 19 specific to the light box, the first dimension 18 and the second dimension 19 being both measured along the stacking axis, is between 40% and 85% inclusive. In other words, the first dimension 18 is measured between the proximal end 16 of the cavity, forming the bottom of the cavity, near the light source associated with said cavity, and the distal end 17 of the cavity situated opposite the cavity relative to the proximal end 16 on the stacking axis Y. The second dimension 19 corresponds to the overall transverse dimension of the light box 4 measured between the proximal end 16 of a cavity and the second termination 22 carrying the screen. This configuration therefore enables maximum projection of the light beam emitted by the light source associated with a cavity onto a screen zone facing said cavity, thus enabling projection of the light beam emitted by the light source associated with the first cavity 9 to be projected at the level of the second screen zone 127. This configuration therefore enables clear segmentation of the light signal generated by the optical system 1, 2, this configuration being of particular interest, in particular when the light signal is dynamic and/or multi-color, each light source of the optical system 1, 2 being activatable independently. The ratio between the first dimension 18 and the second dimension 19 is advantageously adjusted to enable a small overlap of the second screen zone 127 by the light beam emitted by the light source associated with the first cavity 9, enabling improved homogeneity of the light signal generated by the optical system 1, 2. A fraction of the light rays emitted by the light source associated with the first cavity is therefore projected onto the second screen zone. In other words, the part of the wall disposed between two cavities blocks sufficiently, but not totally, the light rays liable to pass from one cavity to the other.

Figure 5:
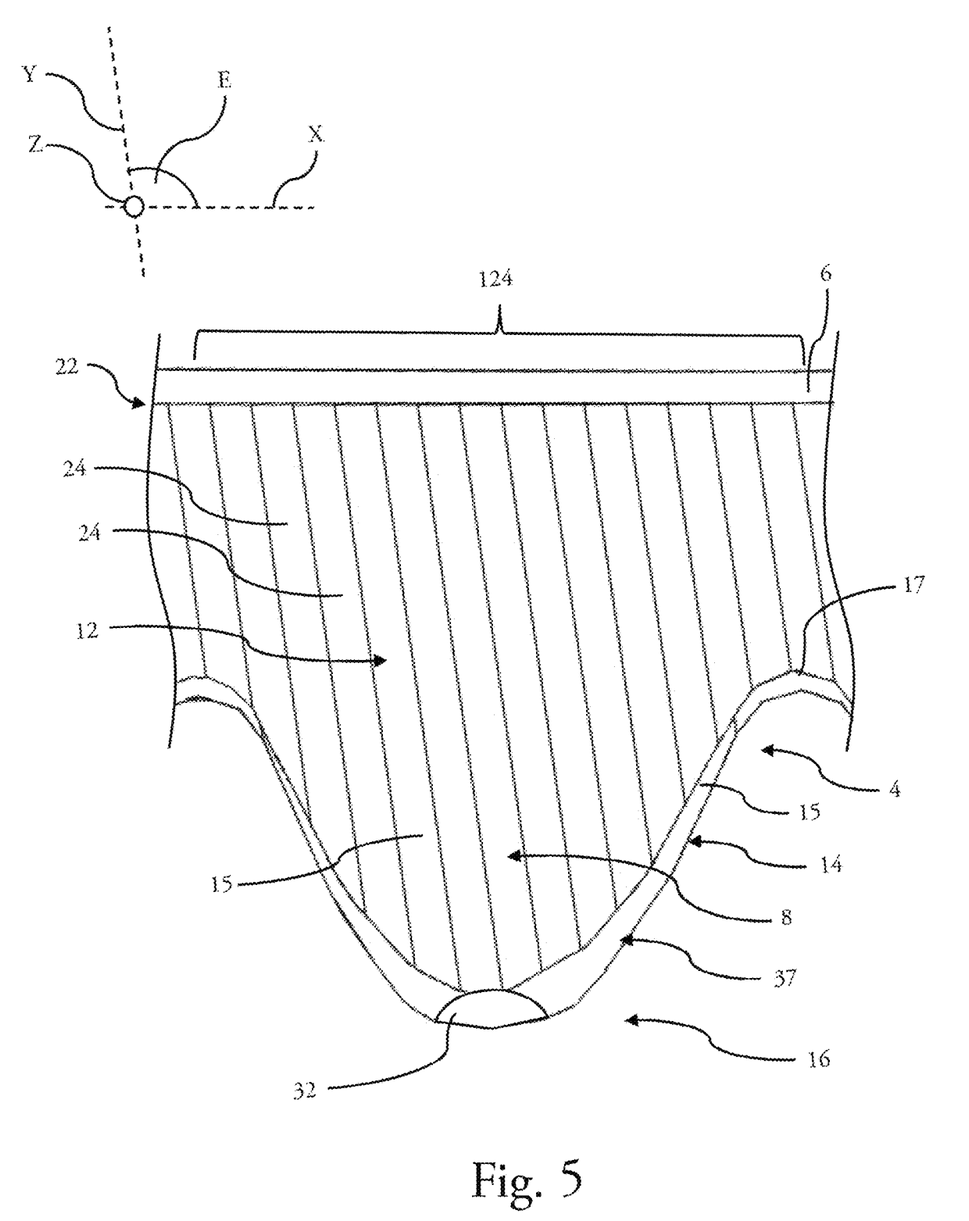
FIG. 5 is a sectional view of one embodiment of an optical system conforming to the first aspect of the invention, on a section plane containing the longitudinal axis and the stacking axis.

FIG. 5 is a sectional view of one embodiment of an optical system 1, 2 conforming to the first aspect of the invention, the section plane E containing the longitudinal axis X and the stacking axis Y; said plane E, termed the second plane E, is perpendicular to a first plane D containing the vertical axis Z and the stacking axis Y.

The cavity 8 has a parabolic profile 37 in the second plane E. In fact, the portion of the wall 14 delimiting the cavity traces out a parabola in the second plane E. The portion of the wall delimiting the cavity more particularly traces out a parabola that extends from one distal end 17 to the other via the proximal end 16. On the other hand, the cavity 8 has an elliptical profile in the first plane D, the portion of the wall delimiting the cavity tracing out an ellipse in the first plane D. The elliptical profile will be seen better in FIG. 6.

A light source 32 is associated with said cavity, the light source 32 being situated near the proximal end 16 of the cavity. In the example shown in FIG. 6 the light source is situated inside the cavity 8, that is to say inside the internal volume 12 of the light box 4. Activation of the light source 32 enables emission of a light beam projected onto the screen 6, where applicable after reflection from the wall 14 delimiting the cavity.

An internal face 15 of the wall 14 is covered with a reflective material enabling reflection of the light beam emitted by the light source 32, the internal face 15 of the wall being oriented toward the interior of the cavity 8. In other words, the internal face 15 is exposed to the light beam emitted by the light source. The reflective material covering the internal face 15 of the wall 14 is preferably white in colour, thereby favouring the reflection of all wavelengths of the light beam emitted by the light source 32.

The internal face 15 of the wall 14 comprises a plurality of diffusing microstructures 24 situated on the elliptical profile of the cavity 8. The diffusing microstructures 24 make it possible to favour diffuse reflection of the light rays of the light beam at the level of the cavity, thereby favouring the homogenization of the light beam inside the light box 4. When an incident light ray of the light beam encounters the wall at the level of a diffusing microstructure it is therefore reflected as a multitude of diffuse reflected light rays, thereby homogenizing the light beam at the level of the cavity. In the example shown, the diffusing microstructures extend between the proximal end 16 of the cavity and the second termination 22 of the light box 4 forming beads extending from the internal face 15 toward the interior of the cavity.

Figure 6:
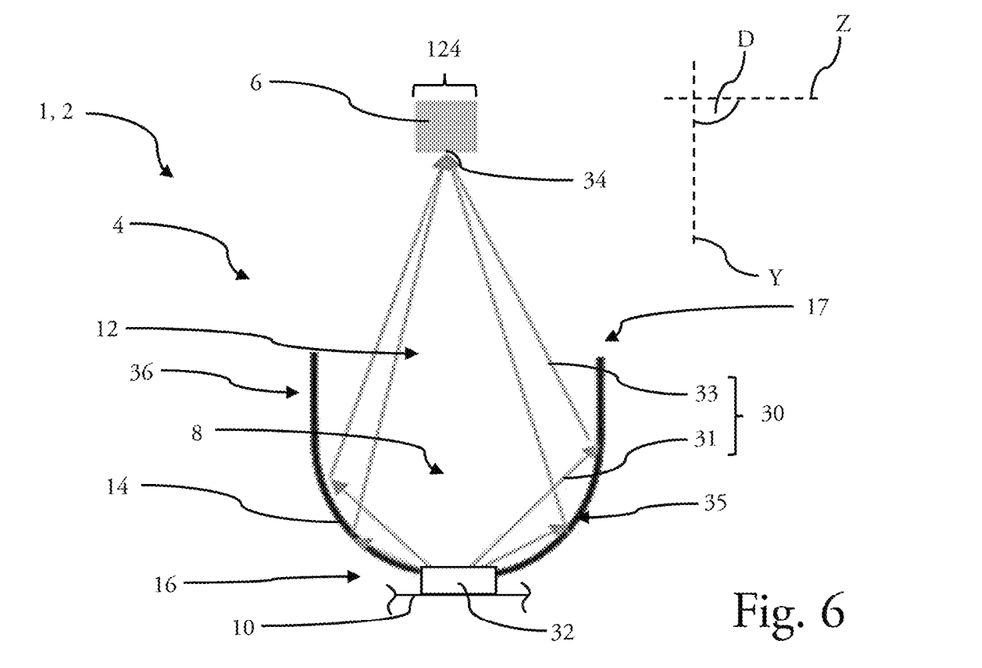
FIG. 6 is a diagrammatic representation of a cavity of one embodiment of an optical system conforming to the first aspect of the invention in a plane containing the vertical axis and the stacking axis.

FIG. 6 is a diagrammatic representation of one embodiment of an optical system 1, 2 conforming to the first aspect of the invention in the first plane D previously referred to.

FIG. 6 therefore makes it possible to visualize the reflection of the light rays 30 forming the light beam emitted by the light source 32 associated with the cavity 8 on the elliptical profile 35 of the wall 14, the light rays being reflectable from the internal face of the wall 14 before being projected onto the screen 6.

The elliptical profile 35 of the wall portion delimiting the cavity in the first plane D more particularly enables concentration of the light rays 30 at the level of the screen 6, the elliptical profile 35 being only partial on the wall portion delimiting the cavity and more particularly in the vicinity of the proximal end 16, the wall portion delimiting the cavity comprising a straight profile 36 substantially parallel to the stacking axis Y in the vicinity of the distal end 17. In fact, the light source 32 is positioned in the vicinity of a first focus of the ellipse traced out by the wall 14 in the first plane D, the screen 6 for its part being positioned in the vicinity of a second focus of the ellipse. When an incident light ray 31 encounters the internal face of the wall 14 forming the elliptical profile said incident light ray 31 is therefore then reflected in the direction of the screen 6, thereby forming a reflected light ray 33. The elliptical profile 35 of the wall 14 enables reflection of the incident light rays 31 so that all of the reflected light rays 33 converge at a point forming the second focus of the ellipse, the screen 6 being positioned in the vicinity of this point. The elliptical profile of the wall 14 of the cavity 8 in the first plan D therefore enables concentration of the light rays 30 in a central zone 34 of the screen 6, the central zone 34 being situated at the centre of the screen on the vertical axis Z, that is to say on a shorter side of the screen zone 124 associated with said cavity 8. This feature enables harmonization of the light signal, that is to say ensures that the occupants of the vehicle do not register a vertical offset of the light signal from one screen zone to the other. By centring the rays exiting each screen zone, the aim is to propose vertical continuity of the signal and therefore the production of a harmonious signal, whether in the case of a static light signal or in the case of a dynamic light signal in which the light signal is transmitted by successively lighting and extinguishing adjacent screen surfaces.

Figure 7:
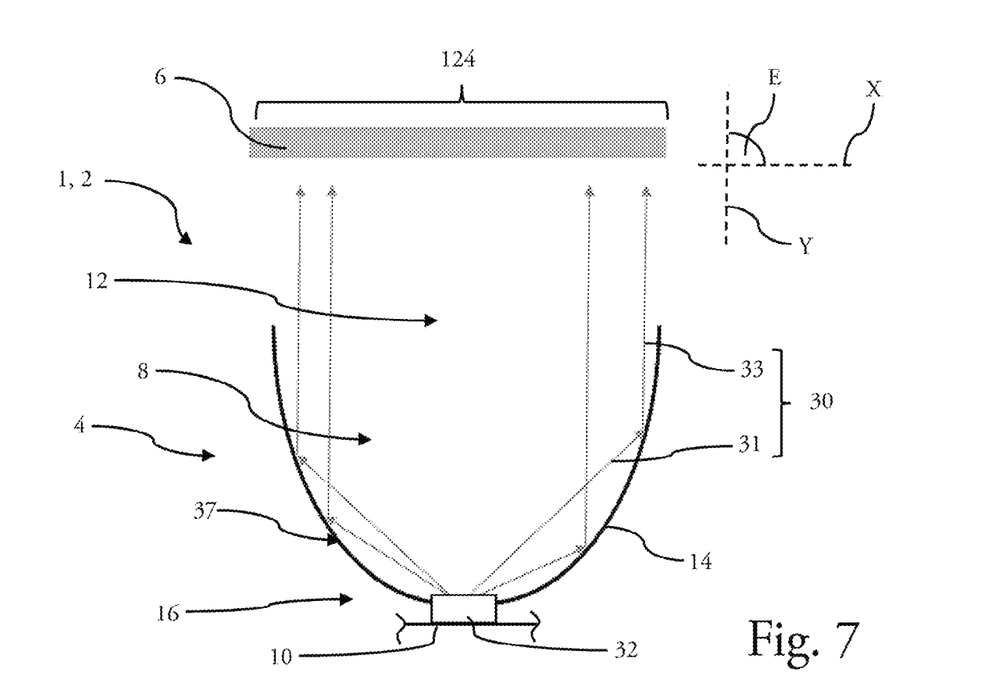
FIG. 7 is a diagrammatic representation of a cavity of one embodiment of an optical system conforming to the first aspect of the invention in a plane containing the longitudinal axis and the stacking axis.

FIG. 7 is a diagrammatic representation in the second plane E of a cavity 8 of one embodiment of an optical system 1, 2 conforming to the first aspect of the invention.

FIG. 7 therefore makes it possible to visualize the reflection of the light rays 30 forming the light beam emitted by the light source 32 associated with the cavity 8 from the parabolic profile 37 of the wall 14, the light rays being reflectable from the internal face of the wall 14 before being projected onto the screen 6.

The parabolic profile 37 of the portion of the wall delimiting the cavity in the second plane E more particularly enables collimation of the light beam formed by all of the light rays 30 emitted by the light source 32. In fact, the light source is positioned in the vicinity of the focus of the parabola traced out by the parabolic profile 37 of the wall 14 in the second plane E. When an incident light ray 31 encounters the internal face of the wall 14 forming the parabolic profile said incident light ray 31 is therefore then reflected in the direction of the screen, forming a reflected light ray 33. The parabolic profile 37 of the wall 14 in the second plane E enables reflection of the incident light rays 31 so that all of the reflected light rays 33 are parallel to one another and to the stacking axis Y. The parabolic profile 37 of the wall in the second plane E therefore enables homogeneous distribution of the light beam, in particular the colorimetry and the luminance of said light beam, over the whole of the screen zone 124 on the longitudinal axis X, that is to say on a longer side of the screen zone 124. The light source possibly being as described above an RGB or RGBW light source, homogenization of the colorimetry of the light beam emitted by said light source enables a homogeneous multi-color light beam to be obtained, that is to say when the hue of which is homogeneous over the whole of the screen zone 124 on the longitudinal axis X.

It may be noted, in particular with reference to the diagrammatic representation of FIGS. 6 and 7, that the extent of the portion of the wall comprising an elliptical profile is less than the extent of the portion of the wall comprising a parabolic profile.

On the one hand, the elliptical profile is in the first plane D containing the vertical axis Z. Now, the overall size is subject to constraints in this section and this imposes a small size of the screen zone onto which to project the light signal.

On the other hand, the use of a parabolic profile in the second plane E, containing the longitudinal axis X, enables the longitudinal dimension of the screen zone lit by the same light source to be increased, which for a given length of the optical system enables a reduced number of light sources in the optical system and therefore reduced production costs of this kind of optical system.

It is clear from FIGS. 6 and 7 that the optical system 1, 2 according to the invention makes it possible to dispense with the use of an additional optical component, such as an optical lens, inserted between the light source 32 and the screen 6 in order to homogenize and to collimate the light beam inside the cavity 8.

Figure 8:
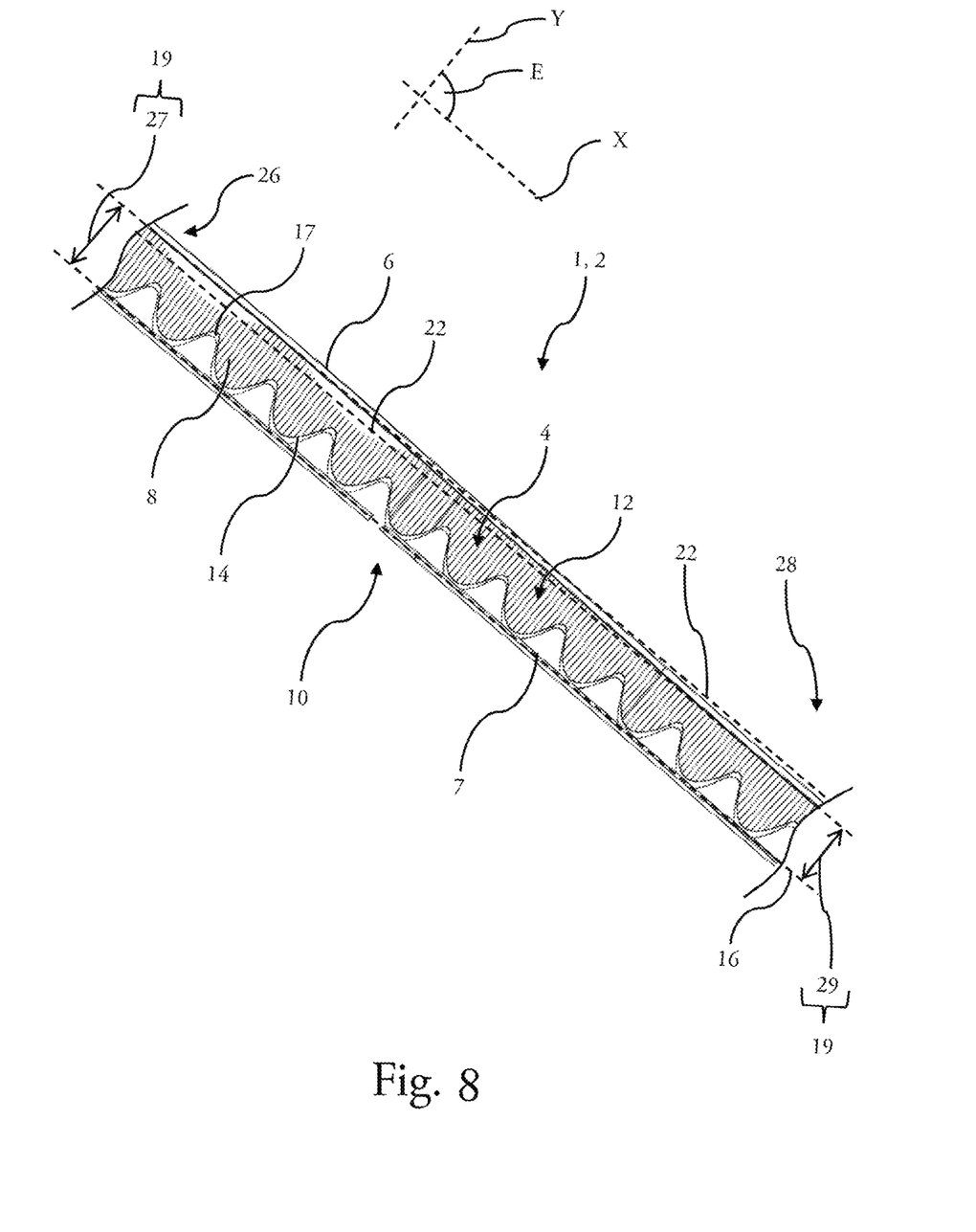
FIG. 8 is a perspective view of another embodiment of an optical system conforming to the first aspect of the invention.

FIG. 8 is a perspective view of another embodiment of an optical system 1, 2 conforming to the first aspect of the invention. The light box 4 of the embodiment shown has a dimension along the stacking axis Y that is variable between a first longitudinal end 26 and a second longitudinal end 28. In other words, the second dimension 19, measured between the proximal end 16 and the second termination 22 of the light box 4, is variable along the longitudinal axis X. As shown, the second dimension measured at the level of the first longitudinal end 26 forms a first depth 27 and the second dimension measured at the level of the second longitudinal end 28 forms a second depth 29 and it can be seen in this FIG. 8 that the first depth 27 is greater than the second depth 29. This configuration is enabled on the one hand by the use of a flexible and/or segmented printed circuit for optimum adaptation of the position of each light source as close as possible to the focus of the ellipse and/or the parabolic focus of the cavity, and on the other hand by the use of a reflective material covering the internal face of the wall enabling partly diffuse reflection of the light beam, thus enabling some flexibility in positioning the light source 32 and/or the screen 6 relative to the foci of the ellipse of the elliptical profile 35 and/or of the parabola of the parabolic profile 37 of the wall 14 of the cavity 8, thus enabling the optical system to exhibit a curvature in order to satisfy constraints, in particular overall size constraints, inside the passenger compartment of the motor vehicle, the optical system being in the form of a strip extending over a great length along the longitudinal axis X, the optical system therefore being subjected to the curvatures of structural elements on which the optical system is placed.

The invention as just described achieves the objectives set for it and makes it possible to propose an optical system of simple design and small overall size enabling homogenization of the light beam that it generates. Variants not described here could be developed without departing from the context of the invention provided that, in accordance with the present invention, the optical system comprises a light box comprising a plurality of cavities each associated with an independently activatable light source.

What is claimed is:

1. An optical system, comprising: a screen; a plurality of light sources disposed in series in a line along a first direction, with the plurality of light sources being configured to be activated independently of one another and to project a light beam onto the screen; and a light box, with the light box being between the plurality of light sources and the screen and the light box including a plurality of cavities, with each of the plurality of light sources being associated with a respective cavity of the light box, with each of the plurality of cavities including a parabolic profile in the first direction and an elliptical profile in a second direction, with the second direction being perpendicular of the first direction, wherein the elliptical profile reflects the light beam towards the center of the screen and the parabolic profile reflects the light beam towards the edges of the screen.

2. The optical system according to claim 1, wherein the elliptical profile is in a first plane perpendicular to the screen and passing through each respective light source associated with said respective cavity.

3. The optical system according to claim 1, wherein the parabolic profile is in a second plane perpendicular to the screen that passes through each light source associated with said respective cavity.

4. The optical system according to claim 1, in which each light source is a red, green, and blue (RGB) light source or a red, green, blue, and white (RGBW) light source.

5. The optical system according to claim 1, in which the light box comprises a dimension along a stacking axis that is variable between a first longitudinal end and a second longitudinal end.

6. The optical system according to claim 1, in which a ratio between a first dimension specific to a wall of a cavity and a second dimension specific to the light box is inclusive between 40% and 85%, where the first dimension and the second dimension is measured parallel to the stacking axis.

7. The optical system according to claim 6, in which an internal face of the wall is covered with a material simultaneously enabling specular reflection and diffuse reflection of the light beam.

8. The optical system according to claim 6, in which the internal face of the wall comprises a plurality of diffusing microstructures.

9. The optical system according to claim 1, in which the screen is a diffusing screen.

10. The optical system according to claim 1, in which the optical system includes a control module configured to give instructions for selective activation of said light sources to enable a display of a dynamic or a multicolour light signal.

11. A motor vehicle including an interior lighting device, the interior lighting device having an optical system comprising: a screen; a plurality of light sources disposed in series in a line along a first direction, with the plurality of light sources being configured to be activated independently of one another and to project a light beam onto the screen; and a light box, with the light box being between the plurality of light sources and the screen and the light box including a plurality of cavities, with each of the plurality of light sources being associated with a respective cavity of the light box, with each of the plurality of cavities including a parabolic profile in the first direction and an elliptical profile in a second direction, with the second direction being perpendicular of the first direction, wherein the elliptical profile reflects the light beam towards the center of the screen and the parabolic profile reflects the light beam towards the edges of the screen.

12. The motor vehicle according to claim 11, in which the optical system is situated at a level of a strip on a door or a dashboard of the motor vehicle.

\* \* \* \* \*